United States Patent [19]

Garbiso

[11] Patent Number: 5,263,687
[45] Date of Patent: Nov. 23, 1993

[54] AUTOMOBILE HARDTOP STORAGE APPARATUS

[76] Inventor: Michael J. Garbiso, 2107 Star Fall, Chino Hills, Calif. 91709

[21] Appl. No.: 767,085

[22] Filed: Sep. 27, 1991

[51] Int. Cl.[5] .............................................. B66D 1/00
[52] U.S. Cl. ................................ 254/334; 248/327; 383/22; 383/67; 414/626
[58] Field of Search ............. 254/269, 334, 335, 336, 254/338; 248/327, 323; 150/166, 168; 383/22, 97, 67; 296/136; 160/370.2; 414/626

[56] References Cited

U.S. PATENT DOCUMENTS

| | | | |
|---|---|---|---|
| 1,266,598 | 5/1918 | Jensen | 296/136 |
| 2,048,461 | 7/1936 | Mosgoffian | 296/136 |
| 2,638,378 | 5/1953 | Molinaro | 296/136 |
| 4,600,177 | 7/1986 | Fritz | 254/338 |
| 4,715,646 | 12/1987 | Goffi et al. | 296/136 |
| 4,830,386 | 5/1989 | Snoke et al. | 211/196 |
| 4,867,216 | 9/1989 | McKee | 150/166 |
| 4,945,935 | 8/1990 | Su | 296/136 |

Primary Examiner—Katherine Matecki
Attorney, Agent, or Firm—Boniard I. Brown

[57] ABSTRACT

An automobile hardtop storage apparatus that includes a flexible cover adapted to be draped over the outer surfaces of a hardtop while in position on the automobile. Attachment devices are carried on edge areas of the cover for attachment of the cover to the hardtop. An overhead lifting device is connectable to the cover for lifting the cover and hardtop to an elevated storage position. Cradle elements at opposite ends of the lifting device support the hardtop when in its storage position.

23 Claims, 3 Drawing Sheets

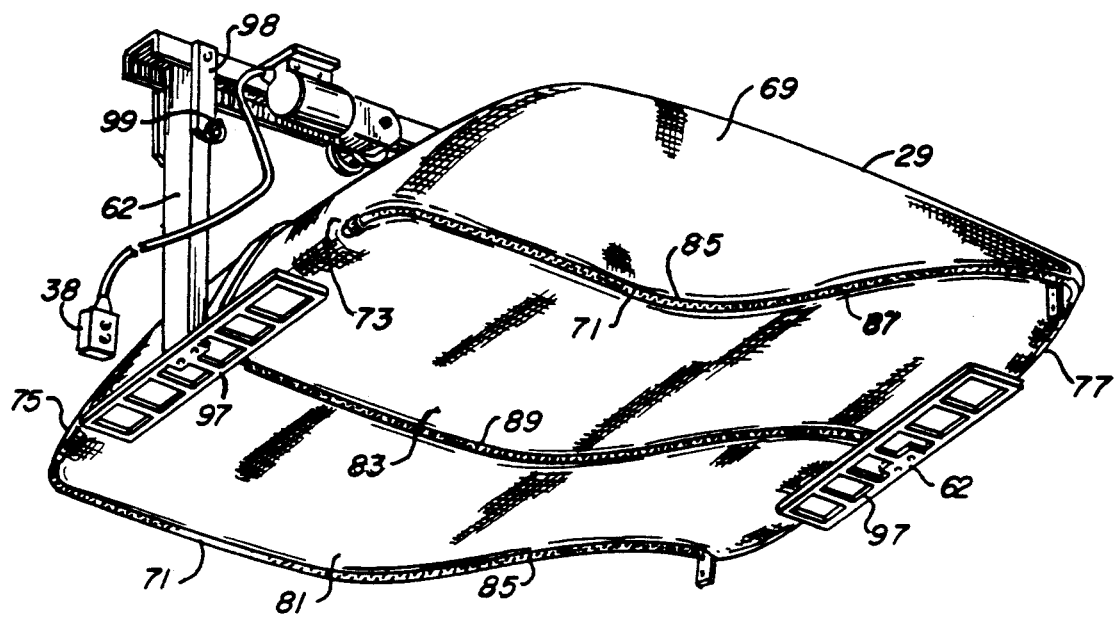
FIG.—1
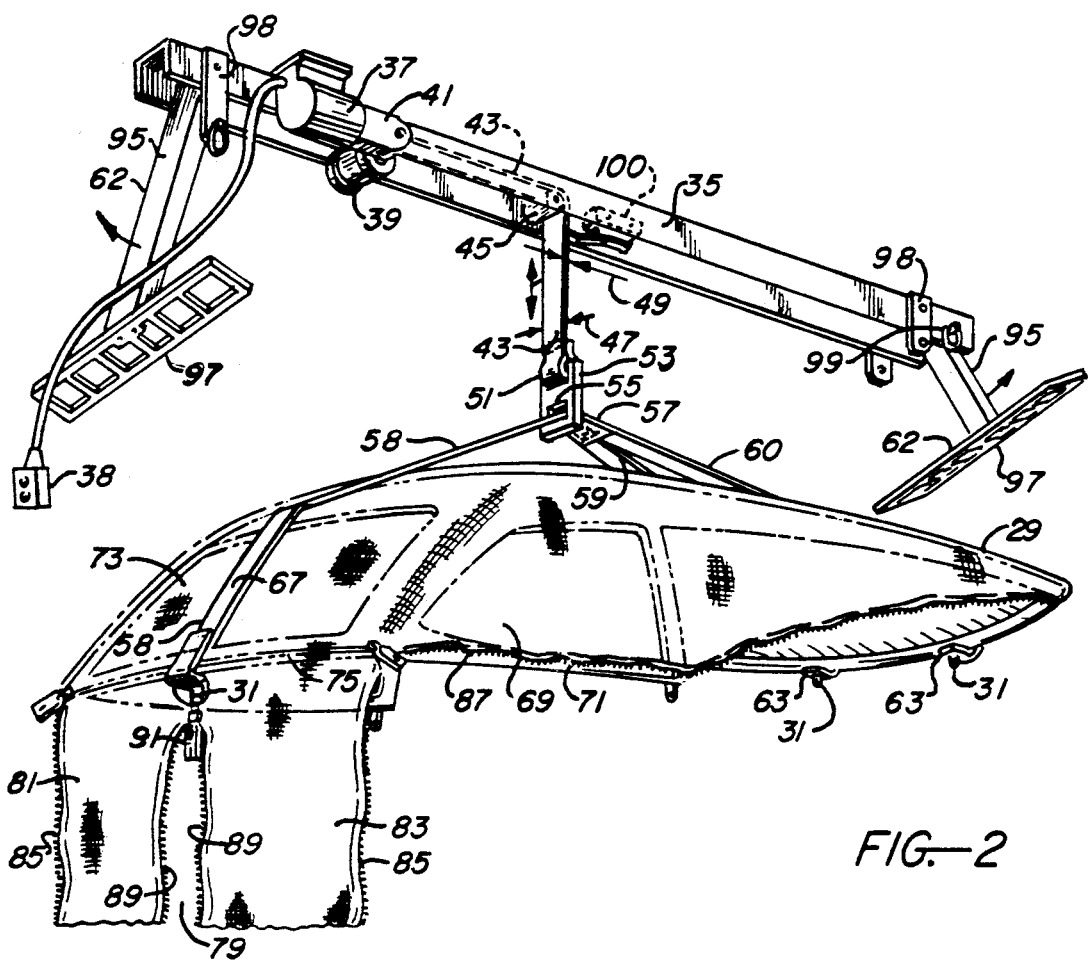
FIG.—2

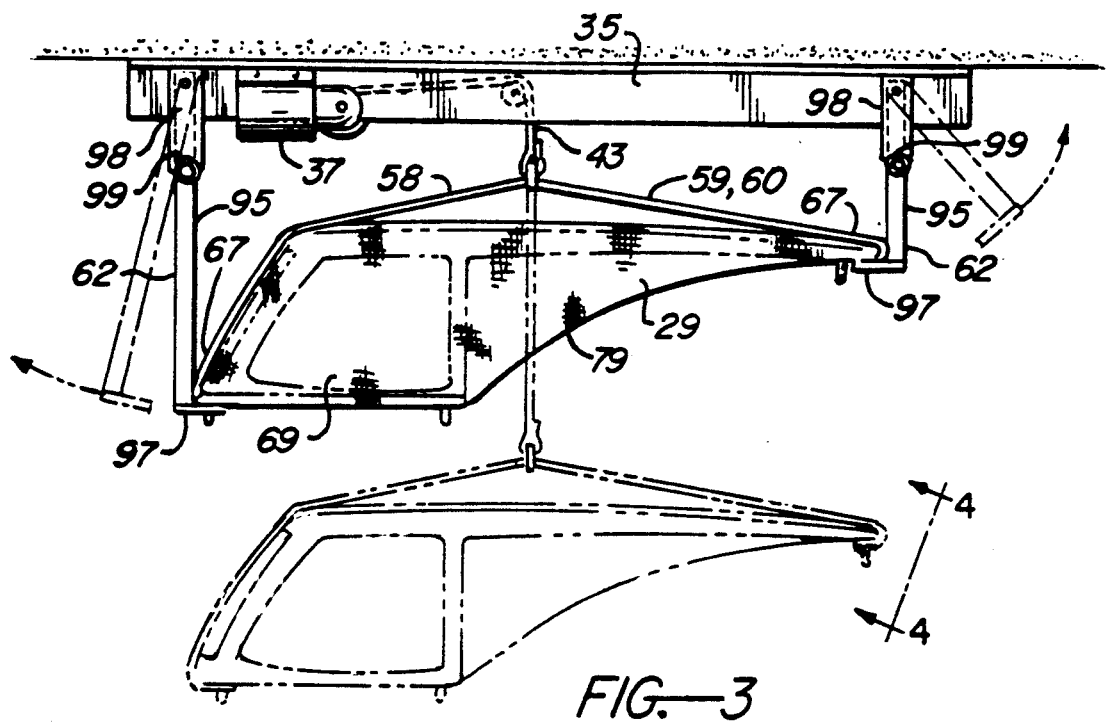
FIG.—3
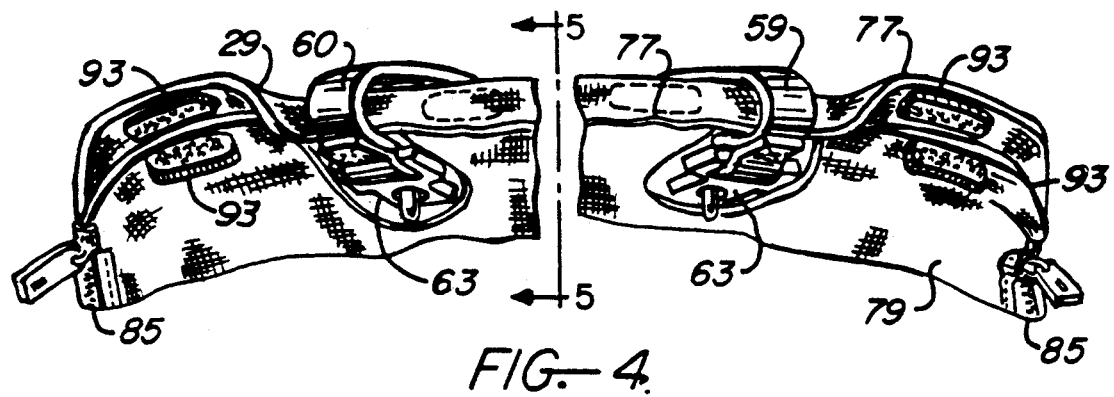
FIG.—4
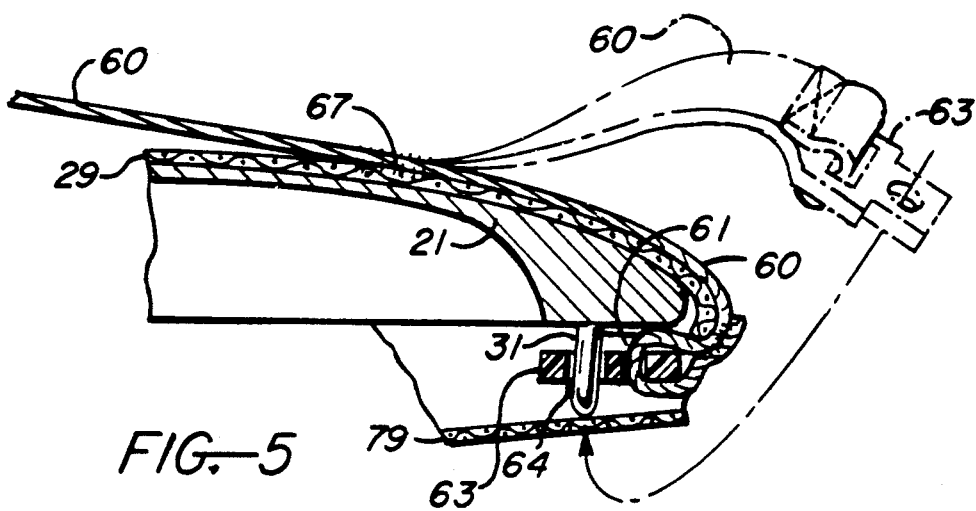
FIG.—5

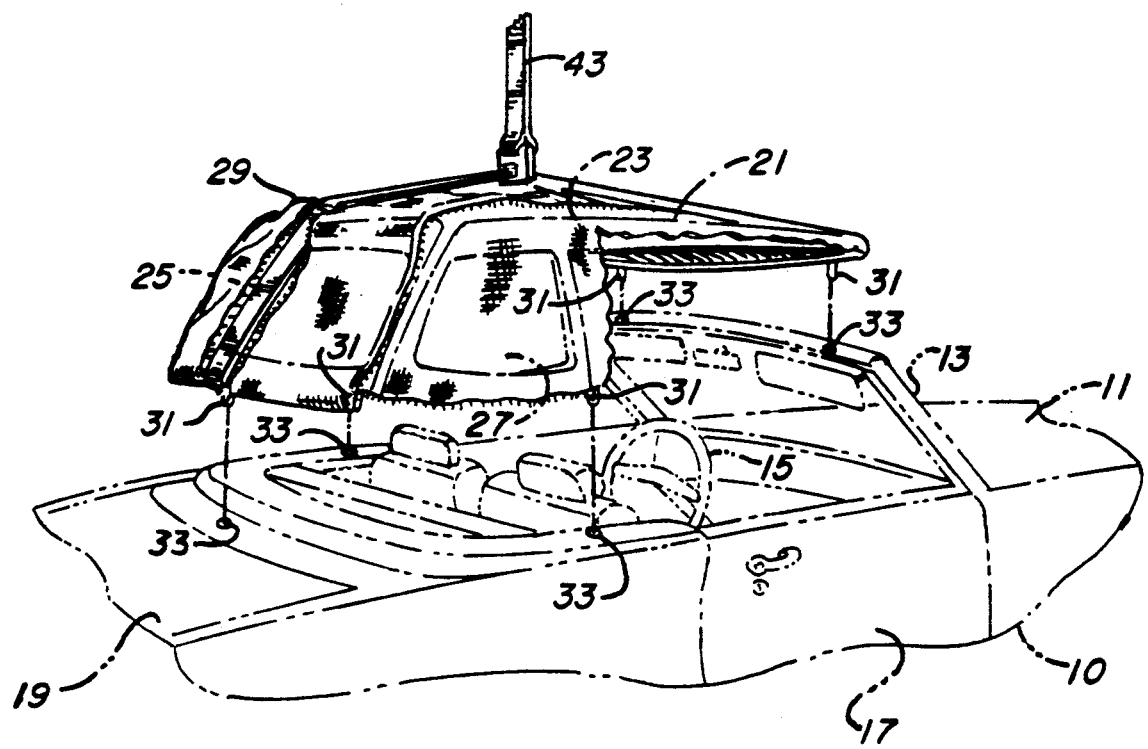
FIG.—6
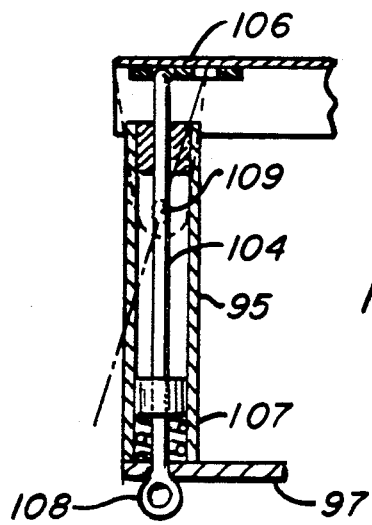
FIG.—7

AUTOMOBILE HARDTOP STORAGE APPARATUS

BACKGROUND OF THE INVENTION

1. Field of the Invention

The present invention relates to storage apparatus for automobile hardtops. Such hardtops are removable structures that form the roof, rear window, and rear side windows of certain automobiles. Hardtops are designed for removal from the associated automobiles when it is desired to use the automobile as a topless convertible or as a soft top vehicle.

2. Prior Developments

There is commercially available a hoist mechanism for lifting a hardtop from an automobile to facilitate storage of the hardtop on a special wheeled cart provided for that purpose. The hoist mechanism comprises a cross bar positionable above the roof area of a hardtop, two spaced gripper devices extending downwardly from opposite ends of the cross bar to grip side surface areas of the hardtop, and an overhead winch-cable system for raising the cross bar, to thereby lift and separate the hardtop from its installed position on the automobile. The aforementioned cart attaches to the cross bar to support the separated hardtop away from the automobile. The cart can be pushed by hand to a storage area.

A disadvantage of the above described system is that the hardtop is not covered when supported on the wheeled cart, and is therefore subject to the accumulation of abrasive dust, etc., thus requiring cleaners and involving potential scratching of the hardtop exterior surface.

Another disadvantage of that system is that the hardtop is stored at ground level. A special area of a room or in the garage must be set aside for storage of the hardtop and the cart when not attached to the hardtop. Also, there is always the possibility of damage by a person's bumping into the cart or the hardtop, or by a person dropping an object onto the hardtop.

Further, the system is relatively costly in requiring two separate hardware devices, i.e., a special hoist mechanism and a special cart. Some manual skills and strength are required to transfer the heavy hardtop from the hoist to the cart.

SUMMARY OF THE PRESENT INVENTION

The present invention relates to a hardtop storage mechanism designed to overcome at least some of the disadvantages of the prior art hoist-cart systems. In one form of the invention, the storage mechanism comprises a flexible cover adapted to be draped over the outer surfaces of a hardtop while it is in its installed position on an automobile. The cover includes connectors at spaced points about its peripheral edge for removably anchoring the cover to the hardtop. An overhead hoist means is affixed to the garage ceiling above the hardtop. The hoist means includes a downwardly extending flexible strap which connects to a central point on the cover. With the flexible cover attached to the hardtop, the hoist means is actuated to lift the covered hardtop vertically upwardly to an overhead storage position separated from the automobile.

The hoist means includes a ceiling-mounted beam, and two longitudinally-spaced swingable cradle elements at opposite ends of the beam. When the hardtop has been lifted to its storage position, the cradle elements can be manually swung to positions underlying the front and rear end portions of the hardtop. The hoist mechanism can then be operated to slightly lower the hardtop onto the cradle elements. The hardtop is thereby safely stored in an overhead location, with opposite end portions thereof resting on the cradle elements. The hardtop is supported in a fixed position without exerting prolonged load on the hoist mechanism.

The flexible cover remains on the hardtop while it is in its overhead storage position. In preferred practice of the invention, the flexible cover has two flexible dust protector panels or flaps hingedly attached thereto. After the hardtop has been lifted to a raised position above the automobile, the dust protector panels are drawn up against the underside of the hardtop and attached to the perimeter of the cover by zipper connections. The hardtop is thus fully encapsulated within and between the cover and the subjacent dust protector panels.

An advantage of the system of the invention is that the hardtop is stored in an overhead location, wherein it does not occupy otherwise useful floor space. Also, the hardtop is fully enclosed within a protective covering, and is thus shielded from dust and scratching of its painted surfaces. Additionally, the system does not require any special cart such as are required in prior art systems. The hoist mechanism of the present invention is operable by a single person, who does not have to bodily lift the hardtop in order to move it from its installed position on the automobile to its overhead storage position.

BRIEF DESCRIPTION OF THE DRAWINGS

FIG. 1 is a perspective view showing an apparatus according to the invention in an elevated position for supporting an automobile hardtop;

FIG. 2 is a view similar to that of FIG. 1, showing the apparatus in a lowered position;

FIG. 3 is a side elevational view of the FIG. 1 apparatus, showing it in two different positions of adjustment;

FIG. 4 is a fragmentary sectional view taken on line 4—4 in FIG. 3;

FIG. 5 is a fragmentary sectional view taken essentially along line 5—5 in FIG. 4;

FIG. 6 is a fragmentary perspective view of the FIG. 1 apparatus, showing an automobile below the apparatus; and FIG. 7 is a fragmentary sectional view of an alternative latch means utilized with the FIG. 1 apparatus.

DESCRIPTION OF A PREFERRED EMBODIMENT OF THE INVENTION

FIG. 6 shows a portion of a conventional automobile 10, including a front hood 11, front windshield 13, steering wheel 15, right hand door 17 and rear trunk 19. A hardtop 21 is shown in an elevated position separated from the automobile.

The hardtop is a conventional structure comprising a roof 23, rear window 25, and two rear side windows. One of the rear side windows 27 is shown. A flexible fabric cover 29 of the present invention is fragmentarily shown draped over the hardtop. Attachment devices 63 (FIG. 5) are associated with the cover for attaching the cover to hardtop 21 so that the cover and hardtop can be raised together as a unit from the automobile.

The hardtop is equipped with five registration pins 31 alignable with socket openings 33 in the vehicle. As seen in FIG. 6, there are two socket openings in the frame of the front windshield, a single socket opening on the longitudinal centerline of the vehicle behind the passenger compartment, and two additional socket openings alongside areas of the vehicle directly behind the vehicle doors. The registration pins on hardtop 21 are spaced apart so that when the hardtop is lowered onto the automobile, the five pins register with and extend into the five socket openings, thereby properly orienting the hardtop with the automobile locking devices (not shown) provided for rigidly connecting the lowered hardtop to the automobile.

The hardtop shown in FIG. 6 is illustrative of commercially available hardtops offered by Mercedes Benz, General Motors (Corvette and Buick), and Chrysler. A typical hardtop weighs approximately one hundred fifty pounds.

FIG. 2 illustrates an overhead hoist Means for lifting the flexible cover and hardtop as a unit from the automobile. The hoist means includes an elongated beam 35 having a channel cross section. The beam is mounted on the ceiling of a garage. An electric motor 37 is attached to one end portion of the beam for Powering a winding drum 39 located within the channel space defined by the beam. An enclosed speed reducer gearing means 41 is operatively connected between motor 37 and drum 39, whereby the drum is driven at a relatively slow rotational speed to raise or lower the hardtop in an elapsed time of about one or two minutes.

A flexible strap-type lifter element 43 is spirally wound on drum 39 and extends within beam 35 and about a pulley 45 mounted between the beam flanges at a central point along the beam length. Strap element 43 has a relatively large width dimension 47 and a relatively small thickness dimension 49. The strap element is wound onto drum 39 so that width dimension 47 is parallel to the drum rotation axis.

The lower free end of strap element 43 is formed into a loop configuration to receive a flat prong portion 51 of a plate-type connector 53. Near its lower end the plate-type connector has a rectangular slot 55 for attachment of the connector to a rectangular fabric web element 57, hereinafter sometimes referred to as strap or flexible elongated tension elements. Three straps 58, 59 and 60 are attached to the web element.

Strap 58 extends rearwardly from web element 57 along the longitudinal centerline of fabric cover 29. Straps 59 and 60 extend forwardly from web element 57 in diverging relation. The divergence of straps 59 and 60 is such that the outer (front) ends of straps 59 and 60 extend directly above the two registration pins 31 at the front end of hardtop 21 (FIG. 6).

Each strap element 58, 59, 60 has an outer free end portion extending through an opening 61 (.FIG. 5) in an attachment plate 63. The plate is thus connected to the strap element. As best seen in FIG. 5, the individual strap element may be manipulated so that the associated attachment plate 63 extends underneath the undersurface of the hardtop. Plate 63 serves as a ring structure to encircle pin 31. An opening 64 in plate 63 can be positioned about the associated registration pin 31 by appropriate manipulation of plate 63. In order to access each pin 31, the adjacent Portion of hardtop 21 must first be lifted a little distance away from the vehicle surface. The user uses one hand to lift the hardtop and the other hand to manipulate the free outer end of the strap element 58, 59 or 60.

Still referring to FIG. 5, the strap element(s) is (are) stitched or otherwise attached to fabric cover 29 at a point 67 spaced from the outer end of the strap element. FIG. 5 is representative of the cover-strap element relationships of the other strap elements 58 and 59. Connections 67 between cover and the three strap elements 58, 59 and 60 orient the three strap elements relative to the cover and registration pins 31. The connections between the three attachment plates 63 and pins effectively connect hardtop 21 to lifter element 43 without undue stresses on fabric cover 29. The three strap elements 58, and 60 transmit the load of hardtop 21 directly to web 57 and lifter element 43 without setting up significant stresses in cover 29. The cover can therefore be formed of a relatively thin low cost soft fabric without sacrificing the service life of the cover.

During the operation of lifting hardtop 21 from a lowered position on the automobile to a raised position near overhead beam 35, it is desirable that the hardtop maintain a fairly level attitude without tilting or significant horizontal rotary motion. Web 57 (FIG. 2) is therefore located at a central point directly above the center of gravity of hardtop 21 when the hardtop is properly attached to the cover by pins 31 and ring structures 63. As the hardtop is raised from the automobile, it will maintain essentially the same attitude it has when it is in place on the automobile. Undue rotation of the hardtop in a horizontal plane is prevented because of the strap-type configuration of lifter element 43. Thus, as the lower end of strap element 43 nears Pulley 45 the cylindrical surface of the Pulley causes the strap element to be oriented so that its width dimension 47 is parallel to the pulley axis. The action of the load on strap element 43 prevents the strap element from twisting from its flat linear configuration of FIG. 2. As a result, the hardtop has its longitudinal axis in a vertical plane coincident with overhead beam 35. Such coincidence is necessary for the hardtop to be properly oriented relative to cradle elements 62.

In order for cover 29 to properly mate to the upper outer surfaces of hardtop 21, the cover is constructed with a three dimensional hood configuration, as seen best in FIG. 1. The cover includes two downwardly extending side walls 69 terminating in cover side edges 71, and a downwardly extending rear wall 73 terminating in a cover rear edge 75.

In order to frilly enclose or encapsulate the hardtop 21, cover 29 is equipped with a flexible fabric dust shield panel means 79 that is split on the longitudinal centerline of cover 29 to form two separate rectangular flaps 81 and 83. Each flap is hingedly attached to the rear edge 75 of cover 29. As the cover-hardtop assembly is initially lifted from the automobile flaps by operation of Motor 37, flaps 81, 83 can hang down from the cover, as shown in FIG. 2. However, the flaps Can be manually moved upwardly and forwardly to close the space below hardtop 21—i.e., the space circumscribed by cover edges 71, 71, 75 and front edge 77. The outer side edge of each flap 81 or 83 has a zipper structure 85 adapted to interlock with a mating zipper structure 87 extending along the associated cover side edge 71. The side flaps 81 and 83 are zipper-connected to cover side walls 69 after the hardtop has been raised a relatively slight distance from the automobile, such as two or three feet. The automobile may be driven out of the garage to facilitate manual manipulation of the flaps and actuation of the zipper structures.

The inner side edges of flaps 81, 83 are equipped with mating zipper structures 89. With flaps 81 and 83 zipper-connected to cover side walls 69, the zipper structures 89 are relatively close together so that the cooperating slide fastener 91 can be drawn forwardly to form a zippered connection between the two flaps, as shown in FIG. 1. The hardtop is thus encapsulated within a fabric envelope defined by cover 29 and flaps 81 and 83. The purpose of splitting the panel 79 into two flaps 81 and 83 is to facilitate the zippered attachment of the panel means to cover 29.

As an optional feature, the joint between front edge 77 of the cover and the front edges of flaps 81 and 83 may be sealed by mating adhesive patches 93 (FIG. 4). Such patches may be formed of commercially available fibrous materials marketed under the tradename VEL-CRO.

Lifter element 43 (FIG. 2)) serves to raise the hardtop-cover assembly to a position near beam 35. However, it is preferred that lifter element 43 not be used to carry the weight of the hardtop for prolonged periods of time, because possible breakage of a weakened lifter strap could allow the hardtop to fall on a person located below the hardtop. Two cradle elements 62 are swingably attached to beam 35 at its opposite ends. Each cradle element includes a generally vertical strut 95 having a transverse shelf-like plate 97 at its lower end. Each cradle element is manually movable between a retracted position (FIG. 2) and an operational position (FIG. 1). A latch pin 99 is removably positioned to extend through aligned openings in brackets 98 carried by beam 35. Each strut 95 has openings therein which align with the bracket 98 openings when the cradle element is in its operational position shown in full lines in FIG. 3. When the cradle element is swung to its retracted position shown in dashed lines in FIG. 3, latch pin 99 can be located to engage a side surface of strut 95 to hold the associated cradle element in the retracted position.

While hardtop 21 is being lifted to a position in near adjacency to beam 35, the two cradle elements 62 are adjusted to their retracted positions shown in dashed lines in FIG. 3. A limit switch 100 (FIG. 2) is mounted within beam 35 in the upward path of connector 53. When the limit switch is tripped by contact with connector 53, motor 37 is automatically stopped to halt the upward motion of hardtop 21. At this point in time, the front and rear edges of the enclosed hardtop are disposed above the cradle element plates 97. Pins 99 can be repositioned to adjust each cradle element 62 to its operational position, after which motor 37 is reversed to lower hardtop 21 onto cradle element plates 97. The cradle elements support the hardtop in its overhead storage position, whereby there is no load on lifter strap 43 or the motor. Motor 37 is located at the end of beam 35 so that it does not interfere with upward motion of cover 29 to a position in close proximity to beam 35.

Latch pins 99 provide a relatively low cost mechanism for retaining each cradle element 62 in its two positions. A somewhat more costly latch means is shown in FIG. 7, and comprises a rod 104 slidably mounted within hollow strut 95 so that its upper end portion can enter into a selected opening in a detent plate 106 carried by beam 35. A compression spring 107 normally biases the rod upwardly to the latched position. A handle 108 may be pulled to draw the rod out of either opening in plate 106, as necessary to reposition the cradle element. Strut 95 is pivotably connected to stationary bracket means for swinging motion about a pivot axis log.

The illustrated apparatus may be utilized for overhead storage of an automobile hardtop for extended periods of time while the hardtop is not being used on the automobile. The weight of the hardtop is borne by cradle elements 62. When it is desired to mount the hardtop on an automobile, the hoist motor 37 is energized to slightly lift the covered hardtop from cradle elements 62, after which the cradle elements are Moved to their retracted positions to permit downward movement of the covered hardtop toward a subjacent automobile by operation of motor 37.

Prior to the covered hardtop reaching the automobile chassis the zippered connections between cover 29 and flaps 81 and 83 are unzipped to uncover the five registration pins 31 (FIGS. 2 and 6). The hardtop is slowly lowered onto the automobile chassis by manual actuation of the motor control switch means 38 (.FIG. 2); at the same time the person uses his/her other hand to guide the hardtop so that pins 31 enter into the registration socket openings 33. When the hardtop is fully lowered onto the automobile, motor 37 is operated for a short period of time to produce a slight slack in strap element 43. Then, three localized areas of the hardtop are manually lifted to disengage ring structures 63 (.FIG. 5) from pins 31. When the manual lift force on the hardtop is removed, pins 31 return into socket openings 33.

When the cover 29-dust panel 79 assembly is not in use it can be detached from lifter element 43 e.g., by separating prong 51 (FIG. 2) from the looped portion of element 43. The cover 29-dust panel 79 assembly is foldable into a compact bundle for storage in the garage.

Thus there has been shown and described a novel storage apparatus for automobile hardtops which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. An automobile hardtop storage apparatus comprising:
   a flexible cover adapted to be draped over and about the upper outer surfaces of a hardtop,
   means on said cover for removably attaching the cover to a hardtop,
   overhead hoist means for lifting the cover and hardtop as a unit to an overhead storage position separated from the automobile, and
   flexible dust shield means hingedly connected with one edge of said cover, said flexible dust shield means being manually movable to a position underlying the hardtop, whereby the hardtop is fully encapsulated within the cover and shield means when in its overhead storage position.

2. The storage apparatus of claim 1, wherein:
   said flexible cover has a rear edge, two side edges and a front edge, said flexible dust shield means has a hinged connection with the cover rear edge, and said flexible dust shield means has disengageable zipper connections with both cover side edges.

3. The storage apparatus of claim 2, wherein:

said flexible cover has a longitudinal centerline alignable with the hardtop centerline, said flexible dust shield means comprises a flexible panel split on the longitudinal centerline to define two separate flaps, each flap having a disengageable zipper connection with an associated side edge of the cover, and said flaps have another zipper connection with each other directly below the cover longitudinal centerline.

4. The storage apparatus of claim 1, wherein:

said overhead hoist means comprises a single flexible lifter element operatively connected with the flexible cover at a central point thereon, said central connection point being in approximately vertical alignment with the center of gravity of the hardtop when the hardtop is attached to the flexible cover, whereby the hardtop maintains an essentially level attitude while being raised to its overhead storage position.

5. The storage apparatus of claim 4, wherein said overhead hoist means comprises:

an elongated ceiling beam member above the longitudinal centerline of the flexible cover, an electric motor and winding drum mounted on said beam member, a pulley mounted on said beam member, said flexible lifter element extending upwardly from said central connection point, about said pulley, and along the beam member onto the winding drum, and at least one hardtop-supporting cradle element swingably suspended from an end portion of said beam member and movable between a retracted position spaced from the hardtop to an operational position underlying an edge portion of the hardtop when the hardtop is in its overhead storage position.

6. The storage apparatus of claim 5, wherein said flexible lifter element comprises:

a flat strap having a relatively large width dimension and a relatively small thickness dimension, said flat strap being spirally wound about said winding drum with its width dimension parallel to the drum rotation axis.

7. The storage apparatus of claim 6, wherein:

said flat strap has its width dimension extending parallel to the rotational axis of said pulley, whereby the pulley engages the width dimension of the strap to minimize any tendency of the strap to twist under loads imposed thereon by the hardtop.

8. The storage apparatus of claim 5, wherein such supporting cradle elements are swingably suspended from opposite ends of the beam member.

9. The storage mechanism of claim 5, and further comprising:

a manually-operated latch means for selectively retaining the cradle element in its retracted position or in its operational position.

10. The storage apparatus of claim 5, wherein each cradle element comprises a strut extending downwardly from the beam member, and a transverse shelf element extending laterally from the strut at its lower end so as to underlie an edge portion of a hardtop when the cradle element strut is swung to an operational position.

11. The storage apparatus of claim 1, wherein:

said overhead hoist means comprises a single flexible lifter element operatively connected to said flexible cover at a central point thereon, said flexible cover has a longitudinal center line, a front edge, two side edges, and a rear edge, a first tension element attached to the rear edge of the cover at a point on the cover centerline, a second tension element attached to the front edge of the cover at a point near one of the cover side edges, and a third tension element attached to the front edge of the cover at a point near the other side edge of the cover, said means for attaching the cover to the hardtop comprises three flexible elongated straps radiating outwardly from said central connection to an outer edge of the cover, each flexible strap having an outer end portion that is free of the cover for manipulation about and under the cover edge, and a ring structure carried by the outer end portion of each strap for positioning about a registration pin on the hardtop.

12. The storage apparatus of claim 11, wherein said flexible cover has an undersurface engageable with an outer surface of a hardtop, said cover having an upper surface facing away from the hardtop, each said flexible strap extending along the upper surface of said flexible cover, each strap being attached to the cover only at a point in near proximity to an associated edge of the cover, whereby the load of the hardtop is transmitted through the straps without generating significant stress in the cover.

13. The storage apparatus of claim 12, wherein said cover is formed of a relatively then soft fabric, and the straps are formed of a heavier fabric suitable for carrying the weight of a hardtop.

14. The storage apparatus of claim 1, wherein:

said overhead hoist means comprises a single flexible lifter element operatively connected to said flexible cover at a central point thereon, said means for attaching the cover to the hardtop comprising a plurality of flexible elongated tension elements radiating outwardly from said central connection point to an outer edge of the cover, each tension element being attached to the cover only at a point in near proximity to an associated edge of the cover so that each tension element has an outer end portion that is free of the cover for manipulation about and under the associated cover edge, and a ring structure carried by the outer end portion of each tension element for positioning about a registration pin on the hardtop; each said ring structure being adapted to encircle an associated registration pin for transmitting the weight of the hardtop to the associated tension element.

15. An automobile hardtop storage apparatus comprising:

a flexible cover adapted to be draped over a hardtop, a plurality of flexible tension elements, each having an inner end connected to a common connection point and an outer end attached to an edge of said flexible cover, a hardtop attachment device connected to the outer end of each tension element, and an overhead hoist mechanism having a flexible lifter element connected to said tension elements at said common connection point, whereby the hardtop and cover can be lifted together to an overhead storage position separated from the automobile.

16. The storage apparatus of claim 15, wherein:
each hardtop attachment device comprises a ring structure adapted to encircle a registration pin on the automobile hardtop.

17. The storage apparatus of claim 15, wherein:
each tension element is an elongated flexible strap.

18. The storage mechanism of claim 15, wherein:
the tension elements are approximately the same length, whereby the common connection point is located at a central point above the hardtop.

19. The storage apparatus of claim 15, wherein there are three flexible tension elements.

20. The storage apparatus of claim 15, and further comprising:
retractable support means movable to a position underlying an edge portion of the hardtop after the hardtop has been lifted to its storage position.

21. The storage apparatus of claim 20, wherein:
said overhead hoist mechanism comprises an elongated ceiling beam member,
said retractable support means comprising a plurality of retractable support elements, wherein one of said retractable support elements is swingably suspended from said beam member at one end thereof, and
another one of said retractable support elements is swingably suspended from said beam member at its other end.

22. An automobile hardtop storage apparatus, comprising:
a flexible cover adapted to be draped over and about the upper outer surfaces of a hardtop,
means on said cover for removably attaching said cover to a hardtop,
overhead hoist means for lifting the cover and the hardtop as a unit to an overhead storage position separated from the automobile,
said overhead hoist means comprising a single flexible lifter element operatively connected to said flexible cover at a central point thereon,
said means for attaching the cover to the hardtop comprising a plurality of flexible elongated tension elements radiating outwardly from said central connection point to outer edges of the cover, each tension element being attached to the cover in near proximity to an edge of the cover so that each tension element has an outer end portion that is free of the cover for manipulation about and under the associated cover edge, and a ring structure carried by the free outer end portion of each tension element for positioning about a registration pin on the hardtop, each said ring structure being adapted to encircle an associated registration pin for transmitting the weight of the hardtop to the associated tension element.

23. The storage apparatus of claim 22, wherein said hoist means comprises a motor-operated winding drum having said flexible lifter element wound thereon, said flexible lifter element comprising a flat strap having a relatively large width dimension extending parallel to the drum axis, and a relatively small thickness dimension extending transverse to the drum axis, whereby the strap tends to prevent undesired rotation of the cover around the central connection point.

* * * * *